US012560554B2

(12) United States Patent
Wada et al.

(10) Patent No.: US 12,560,554 B2
(45) Date of Patent: Feb. 24, 2026

(54) SILICON WAFER DEFECT INSPECTION METHOD AND SILICON WAFER DEFECT INSPECTION SYSTEM

(71) Applicant: SUMCO CORPORATION, Tokyo (JP)

(72) Inventors: Naoyuki Wada, Tokyo (JP); Takehiro Tsunemori, Tokyo (JP)

(73) Assignee: SUMCO CORPORATION, Tokyo (JP)

( * ) Notice: Subject to any disclaimer, the term of this patent is extended or adjusted under 35 U.S.C. 154(b) by 465 days.

(21) Appl. No.: 17/789,065

(22) PCT Filed: Sep. 29, 2020

(86) PCT No.: PCT/JP2020/036994
§ 371 (c)(1),
(2) Date: Jun. 24, 2022

(87) PCT Pub. No.: WO2021/131207
PCT Pub. Date: Jul. 1, 2021

(65) Prior Publication Data
US 2023/0042102 A1 Feb. 9, 2023

(30) Foreign Application Priority Data

Dec. 26, 2019 (JP) .................................. 2019-236549

(51) Int. Cl.
G01N 21/95 (2006.01)
(52) U.S. Cl.
CPC ................................ G01N 21/9501 (2013.01)

(58) Field of Classification Search
CPC ....... G01N 21/9501; G01N 2021/8477; G01N 21/8806; G01N 21/956; C30B 29/06; H01L 22/12
See application file for complete search history.

(56) References Cited

U.S. PATENT DOCUMENTS

| | | | |
|---|---|---|---|
| 8,804,109 B2 * | 8/2014 | Aiko | H04N 7/18 356/237.5 |
| 10,942,132 B2 * | 3/2021 | Lee | G01N 21/8851 |

(Continued)

FOREIGN PATENT DOCUMENTS

| | | |
|---|---|---|
| DE | 112016004591 T5 | 8/2018 |
| JP | e H09-061365 | 3/1997 |

(Continued)

OTHER PUBLICATIONS

International Search Report issued in International Patent Application No. PCT/JP2020/036994, dated Dec. 8, 2020, along with an English translation thereof.

(Continued)

*Primary Examiner* — Hung V Nguyen
(74) *Attorney, Agent, or Firm* — Greenblum & Bernstein, P.L.C.

(57) ABSTRACT

In a side view, when an angle $\theta 1$ formed between the light axis of light incident on a surface of a silicon wafer and the surface (or an imaginary plane corresponding to the surface) is 67° to 78° and an angle formed between the surface of the silicon wafer (or an imaginary plane corresponding to the surface) and the detection optical axis of a photodetector is $\theta 2$, $\theta 1 - \theta 2$ is -6° to -1° or 1° to 6°.

2 Claims, 1 Drawing Sheet

(56)  References Cited

U.S. PATENT DOCUMENTS

| | | | |
|---|---|---|---|
| 11,143,600 B2 * | 10/2021 | Honda | H01L 22/12 |
| 2006/0001877 A1 | 1/2006 | Moriya | |
| 2011/0149275 A1 * | 6/2011 | Nakano | G01N 21/95607 |
| | | | 356/237.2 |
| 2013/0182100 A1 * | 7/2013 | Aiko | H04N 7/18 |
| | | | 348/87 |
| 2017/0315456 A1 | 11/2017 | Lin et al. | |
| 2019/0041340 A1 | 2/2019 | Kondo et al. | |
| 2019/0279357 A1 | 9/2019 | Zhong et al. | |

FOREIGN PATENT DOCUMENTS

| | | |
|---|---|---|
| JP | f 2006-017630 | 1/2006 |
| JP | 2009-236791 | 10/2009 |
| JP | C 2010-251542 | 11/2010 |
| JP | b 2013-019780 | 1/2013 |
| JP | a 2017-174933 | 9/2017 |
| JP | d 2019-521368 | 7/2019 |
| TW | h 201738983 | 11/2017 |
| TW | g 201940867 | 10/2019 |
| WO | 2019/159334 | 8/2019 |

OTHER PUBLICATIONS

Office Action issued in Corresponding Taiwanese Patent Application No. 109136849, dated Dec. 7, 2021, along with an English translation thereof.

International Preliminary Report on Patentability in International Patent Application No. PCT/JP2020/036994, dated Jun. 28, 2022, along with an English translation thereof.

Office Action issued in Corresponding Japanese Patent Application No. 2019-236549, dated Aug. 9, 2022, along with an English translation thereof.

Office Action issued in Corresponding KR Patent Application No. 10-2022-7021518, dated Jul. 12, 2024, along with an English translation thereof.

Office Action issued in Corresponding DE Patent Application No. 112020006353.4, dated Jun. 13, 2025, along with an English translation thereof.

Office Action issued in Corresponding KR Patent Application No. 10-2022-7021518, dated February 1, 2025, along with an English translation thereof.

* cited by examiner

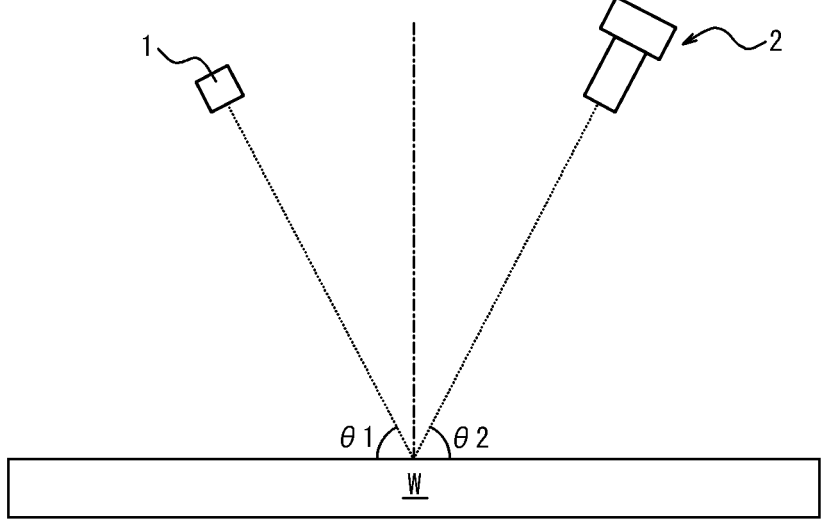

SILICON WAFER DEFECT INSPECTION METHOD AND SILICON WAFER DEFECT INSPECTION SYSTEM

TECHNICAL FIELD

This disclosure relates to a silicon wafer defect inspection method and a silicon wafer defect inspection system.

BACKGROUND

Conventionally, silicon wafer are subjected to inspections for slip dislocations formed therein. Slip dislocations are shallow steps of a silicon atom level that appear due to the movement of dislocations, and have a length in the direction of the crystal orientation.

For example, JP 2017-174933 A (PTL 1) discloses a method of defect inspection on a silicon wafer using laser light. This method detects defects formed on a surface of a silicon wafer by irradiating the surface of the silicon wafer with laser light from a laser light source and detecting reflected light with a photodiode.

CITATION LIST

Patent Literature

PTL 1: JP 2017-174933 A

SUMMARY

Technical Problem

However, with the technique of PTL 1, sufficient detection sensitivity would not be obtained because for example laser light scattering is stronger in a peripheral portion of a silicon wafer where slip dislocations are mainly formed.

It could therefore be helpful to provide a silicon wafer defect inspection method and a silicon wafer defect inspection system that make it possible to detect slip dislocations formed on a surface of a silicon wafer with high sensitivity.

Solution to Problem

This disclosure primarily includes the following features.

A silicon wafer defect inspection method includes:

a light irradiation step of irradiating a surface of a silicon wafer with light from a light source; and a light detection step of detecting light reflected off the surface using a photodetector.

In a side view of the silicon wafer, when an angle $\theta 1$ formed between a light axis of light incident on the surface of the silicon wafer and the surface is 67° to 78° and an angle formed between the surface of the silicon wafer and a detection optical axis of the photodetector is $\theta 2$, $\theta 1 - \theta 2$ is one of −6° to −1° and 1° to 6°.

The "detection optical axis" refers to an axis in the direction of the normal to the detector plane of the photodetector.

A silicon wafer defect inspection system, includes:

a light source enabling irradiation of a surface of a silicon wafer with light; and a photodetector that detects light reflected off the surface.

In a side view corresponding to a side of the silicon wafer, when an angle $\theta 1$ formed between a light axis of light incident on the surface of the silicon wafer and an imaginary plane corresponding to the surface is 67° to 78° and an angle formed between the imaginary plane corresponding to the surface of the silicon wafer and a detection optical axis of the photodetector is $\theta 2$, $\theta 1 - \theta 2$ is one of −6° to −1° and 1° to 6°.

Advantageous Effect

This disclosure can provide a silicon wafer defect inspection method and a silicon wafer defect inspection system that make it possible to detect slip dislocations formed on a surface of a silicon wafer with high sensitivity.

BRIEF DESCRIPTION OF THE DRAWINGS

In the accompanying drawing, FIG. 1 is a side view illustrating an example of an optical system that can be used for a silicon wafer defect inspection method according to one embodiment of this disclosure.

DETAILED DESCRIPTION

Embodiments of the method and system for detecting defects on a silicon wafer, according to this disclosure will now be described in detail with reference to the drawing.

<Silicon Wafer Defect Inspection Method>

A defect inspection method for a silicon wafer, according to one embodiment of this disclosure is described. FIG. 1 is a side view illustrating an example of an optical system that can be used for the method according to this embodiment. FIG. 1 is a diagram of a silicon wafer W viewed from a side.

As illustrated in FIG. 1, the optical system includes a silicon wafer W to be subjected to defect inspection, a light source 1 enabling irradiation of a surface of the silicon wafer W with light, and a photodetector 2 that detects light reflected off the surface.

The light source 1 may be a given one of known light sources that can be used to inspect defects on the surface of the silicon wafer W. The light source 1 is preferably a light guide for spot illumination that can emit approximately collimated light; alternatively, for example, a condensing lamp of fluorescence light or a laser light source may be used.

The photoelectric detector 2 can be a given known one that can detect defects on the surface of the silicon wafer W by detecting light reflected off the surface of the silicon wafer W. The photoelectric detector 2 is preferably a high resolution area camera (for example, the resolution may be, but not limited to, 1.0 MPixel to 3.0 MPixel, and the frame rate may be, but not limited to, 50 fps to 200 fps) having a high resolution lens (may be for example, but not limited to, a telecentric lens having for example a magnification of 0.5× to 1.5× and a depth of focus of 50 mm to 80 mm).

Now, in the side view of FIG. 1 (a side view of the silicon wafer W), when the angle $\theta 1$ formed between the light axis of light incident on the surface of the silicon wafer W and the surface ("90°—(angle of incidence)" as illustrated in FIG. 1) is 67° to 78° and the angle formed between the surface of the silicon wafer W and the detection optical axis of the photodetector 2 is $\theta 2$, $\theta 1 - \theta 2$ is −6° to −1° or 1° to 6°.

The background of how the method and system of this disclosure have been invented will be described.

With a view to solving the above problem, the present inventors made diligent studies to obtain an optical system that can detect slip dislocations formed on silicon wafers with high sensitivity. The present inventors studied the angle of incidence and the position of the photodetector beyond the conventional common knowledge in the art that light can easily be concentrated at positions at an angle of reflection equal to the angle of incidence of light on the silicon wafer and a photodetector is placed at this angle, and found out that when the angle θ1 is within a given narrow range, placing the photodetector at an angle within a given narrow range deliberately deviated from the positions of the angle of reflection equal to the angle of incidence of light on the silicon wafer makes it possible to detect slip dislocations formed on the surface of the silicon wafer with high sensitivity.

The experiment will now be described in detail.

As an object of inspection for surface defects, a p-type silicon wafer with a diameter of 300 mm having a crystal orientation of (100) was prepared. As a light source, a light guide for spot illumination that can emit approximately collimated light was prepared, and a high resolution area camera having a high resolution lens was prepared as a photodetector.

Inspection for surface defects was performed on a peripheral portion of the silicon wafer (a region of 6 mm extending from the edge of the silicon wafer inward in the radial direction) while changing the positions of the above light source and the photodetector by changing the above angles θ1 and θ2. The inspection was performed for a range from the direction of the crystal orientation (0°) as a reference to 45°.

The evaluation results are given in Table 1 below. Note that in Table 1, a rating "A" indicates very satisfactory quantity of light, a rating "B" indicates favorable quantity of light, and a rating "C" indicates insufficient or excessive quantity of light. When rated "A" or "B", the quantity of light is satisfactory, and slip dislocations formed on the surface of the silicon wafer can be detected with high sensitivity.

−4° or 4°, when the angle θ1 was 74° and θ1−θ2 was −4°, −3°, or 4°, when the angle θ1 was 75° and θ1−θ2 was −3° or 3°, and when the angle θ1 was 78° and θ1−θ2 was −4°, 3°, or 4°; the rating was A and was particularly satisfactory.

Based on the above findings, the silicon wafer defect inspection method of this embodiment includes a light irradiation step of irradiating a surface of a silicon wafer with light from a light source; and a light detection step of detecting light reflected off the surface using a photodetector, and in a side view of the silicon wafer, when the angle θ1 formed between the light axis of light incident on the surface of the silicon wafer and the surface is 67° to 78° and the angle formed between the surface of the silicon wafer and the detection optical axis of the photodetector is θ2, θ1−θ2 is −6° to −1° or 1° to 6°.

It is particularly preferred that with the angle θ1 being 67°, θ1−θ2 is −3° or 3°; with the angle θ1 being 70° to 73°, θ1−θ2 is −4° or 4°; with the angle θ1 being 74°, θ1−θ2 is −4°, −3°, or 4°; with the angle θ1 being 75°, θ1−θ2 is −3° or 3°, and with the angle θ1 being 78°, θ1−θ2 is −4°, 3°, or 4°.

<Silicon Wafer Defect Inspection System>

A silicon wafer defect inspection system according to one embodiment of this disclosure includes a light source enabling irradiation of a surface of a silicon wafer with light; and a photodetector that detects light reflected off the surface. In a side view of the silicon wafer, when the angle θ1 formed between the light axis of light incident on the surface of the silicon wafer and an imaginary plane corresponding to the surface is 67° to 78° and the angle formed between the imaginary plane corresponding to the surface of the silicon wafer and the detection optical axis of the photodetector is θ2, θ1−θ2 is −6° to −1° or 1° to 6°.

TABLE 1

| | | Angle θ2(°) | | | | | | | | | | | | | | | | | | | | | |
| | | 60 | 61 | 62 | 64 | 66 | 67 | 68 | 69 | 70 | 71 | 72 | 73 | 74 | 75 | 76 | 77 | 78 | 79 | 80 | 81 | 82 | 84 | 86 |
|---|---|---|---|---|---|---|---|---|---|---|---|---|---|---|---|---|---|---|---|---|---|---|---|---|
| Angle θ1(°) | 60 | C | C | C | C | C | C | C | C | C | C | C | C | C | C | C | C | C | C | C | C | C | C | C |
| | 65 | C | C | C | B | B | B | B | C | C | C | C | C | C | C | C | C | C | C | C | C | C | C | C |
| | 67 | C | B | B | A | B | C | B | B | A | B | B | B | C | C | C | C | C | C | C | C | C | C | C |
| | 70 | C | C | C | B | A | B | B | B | C | B | B | B | A | B | B | C | C | C | C | C | C | C | C |
| | 73 | C | C | C | C | B | B | B | A | B | B | B | C | B | B | B | A | B | B | B | C | C | C | C |
| | 74 | C | C | C | C | C | C | B | B | A | B | B | B | C | B | B | A | A | B | B | C | C | C | C |
| | 75 | C | C | C | C | C | C | C | B | B | B | A | B | B | C | B | B | A | B | B | B | C | C | C |
| | 78 | C | C | C | C | C | C | C | C | C | C | B | B | A | A | B | B | C | B | B | B | A | B | C |
| | 80 | C | C | C | C | C | C | C | C | C | C | C | C | C | C | B | B | C | C | C | C | C | B | C |
| | 85 | C | C | C | C | C | C | C | C | C | C | C | C | C | C | C | C | C | C | C | C | C | C | C |

Table 1 demonstrates that in a case where the angle θ1 formed between the light axis of light incident on the surface of the silicon wafer and the surface is 67° to 78° and an angle formed between the surface of the silicon wafer and the detection optical axis of the photodetector is θ2, when θ1−θ2 is −6° to −1° or 1° to 6°, the rating was "A" or "B" and was satisfactory.

This may be attributed to that in detecting objects exhibiting low light scattering intensity depending on the crystallographic axis, since the intensity of the reflected light is high in an area close to the center of the bright field of view, the contrast is hardly perceived, and on the other hand, in an area close to the boundary with the dark field of view, the intensity of the reflected light is low, resulting in high contrast, thus the defects can easily be observed.

Specifically, when the angle θ1 was 67° and Θ1−θ2 was −3° or 3°, when the angle θ1 was 70° to 73° and θ1−θ2 was The light source and the photodetector are the same as those described in relation to the silicon wafer defect inspection method, so the description will not be repeated.

Specifically, it is preferred that with the angle θ1 being 67°, θ1−θ2 is −3° or 3°; with the angle θ1 being 70° to 73°, θ1−θ2 is −4° or 4°; with the angle θ1 being 74°, θ1−θ2 is −4°, −3°, or 4°; with the angle θ1 being 75°, θ1−θ2 is −3° or 3°, and with the angle θ1 being 78°, θ1−θ2 is −4°, 3°, or 4°.

REFERENCE SIGNS LIST

1: Light source
2: Photodetector
W: Silicon wafer

The invention claimed is:
1. A silicon wafer defect inspection method comprising:
   irradiating a surface of a silicon wafer with light from a light source; and detecting light reflected off the surface using a photode-
tector, wherein in a side view of the silicon wafer, when an angle
$\theta 1$ formed between a light axis of light incident on the
surface of the silicon wafer and the surface is 67° to 78°
and an angle formed between the surface of the silicon
wafer and a detection optical axis of the photodetector
is $\theta 2$, $\theta 1-\theta 2$ is one of −6° to −1° and 1° to 6°.

2. A silicon wafer defect inspection system, comprising:

a light source enabling irradiation of a surface of a silicon
wafer with light; and a photodetector that detects light reflected off the surface, wherein in a side view corresponding to a side of the
silicon wafer, when an angle $\theta 1$ formed between a light
axis of light incident on the surface of the silicon wafer
and an imaginary plane corresponding to the surface is
67° to 78° and an angle formed between the imaginary
plane corresponding to the surface of the silicon wafer
and a detection optical axis of the photodetector is $\theta 2$,
$\theta 1-\theta 2$ is one of −6° to −1° and 1° to 6°.

* * * * *